Figure 1:
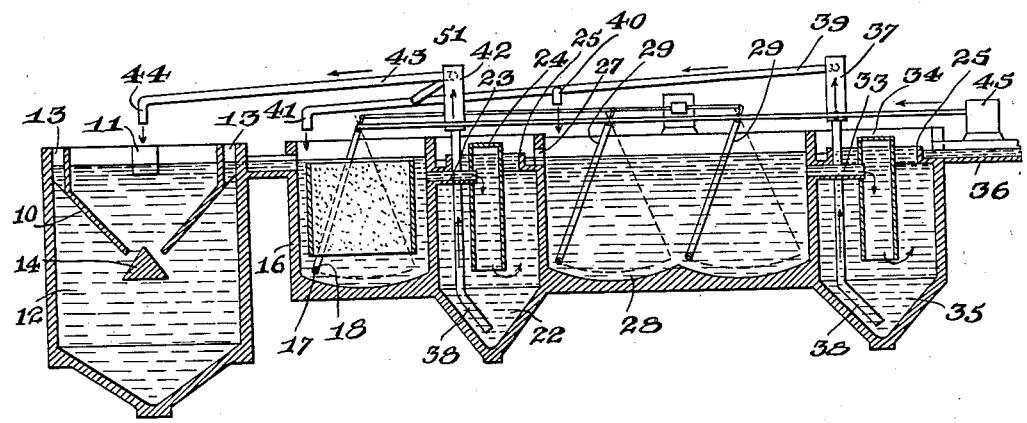

Jan. 10, 1933.   K. IMHOFF   1,893,623
SEWAGE PURIFICATION
Filed Aug. 30, 1930

Inventor
Karl Imhoff
By C. P. Gorpel
Attorney

Patented Jan. 10, 1933

1,893,623

UNITED STATES PATENT OFFICE

KARL IMHOFF, OF ESSEN, GERMANY

SEWAGE PURIFICATION

Application filed August 30, 1930, Serial No. 479,046, and in Germany January 20, 1930.

The present invention relates to sewage purification, and more particularly to an apparatus and process for the biological purification of the organically soiled sewage by submerged contact aerators and activated sludge tanks.

Another object of the present invention is to provide an apparatus which is relatively compact or condensed, which carries out the process in stages arranged in series and with certain improved means for returning certain settlings from the different stages for reactivating the same and insuring the complete purification and treatment of the sewage throughout the process and the utilization of the excess activated sludge in the different stages in the apparatus.

A further object of the invention is to provide a two-stage activated sludge plant which requires a space approximately from thirty to fifty per cent smaller than the heretofore known one stage plants endeavoring to obtain the same result.

A still further object of the invention is to combine in a process and plant of this character two-stages with the first stage of the submerged contact aerator type and the second stage of the activated sludge tank type.

With the foregoing and other objects in view, the invention will be more fully described hereinafter, and will be more particularly pointed out in the claims appended hereto.

In the drawing, wherein like symbols refer to like or corresponding parts throughout the several views.

Figure 2:
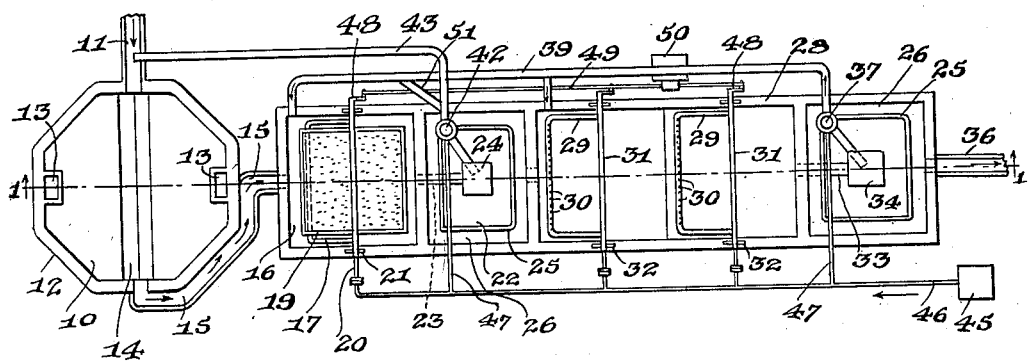

Figure 1 is a longitudinal section taken through a plant constructed according to the present invention and which may be used in carrying out the process of this invention, and Figure 2 is a top plan view of the same.

Referring now to the drawing, 10 designates a preliminary settling tank into one side and in the top of which opens a conduit 11 for the sewage. This settling tank 10 is located within the upper end of a sludge digestion tank 12 of suitable depth and construction and which is closed at its top by the settling tank with the exception of one or more vent openings 13, as shown in the drawing.

The bottom of the settling tank 10. converges toward a central transverse line, and the bottom is slotted and provided with a deflector 14 extending transversely in the tank 12 and beneath the slot in the bottom of the settling tank 10 for directing the sewage to the opposite sides of the tank 12. This deflector 14 may be in the form of a bar triangular in cross section with an apex projecting up through the slot in the bottom of the tank but in spaced relation to the marginal edges of the top of the tank 10.

A second conduit 15 leads out of the upper portion of the preliminary settling tank 10 at its side preferably opposite to the sewage supply conduit 11 and the conduit 15 is carried around the adjacent side of the tank 12 as shown in Figure 2 and opens through the adjacent end wall of a contact aerator tank 16, near the top thereof.

The aerator tank 16 is provided with a stirrer 17 of preferably U-shape and which is hollow to receive air adapted to be delivered in jets through openings 18 formed in the upper side of the lower cross bar of the stirrer 17. The stirrer 17 is of suitable width and length to extend downwardly about the inner compartment 19 of the aerator tank 16 and is supported upon a hollow cross shaft 20 mounted in suitable bearings 21 across the top of the aerator tank 16.

From the tank 16 the aerated sewage passes into a settling tank 22 disposed closely adjacent to the aerator tank 16 and connected thereto by a conduit 23. The conduit 23 opens into the upper end of a delivery bell 24 which has its open lower end spaced above the bottom of the settling tank 22, and the latter is provided at its upper end with an inwardly offset overflow wall or dam 25 extending entirely around the upper end of the settling tank 22 and providing a channel or passage 26 into which the lighter liquid content of the sewage is adapted to spill.

The channel 26 opens through a passage 27 formed in the end wall of the tank 22 remote from the conduit 23. The settling tank 22 completes the first stage of the process and the liquor which is separated off from the settling tank 22 is carried through the opening 27 into the next stage of the plant.

The second stage of the process calls for the passage of the separated liquor from the first stage into an activated sludge tank 28, and such tank is shown in the drawing as having an end wall in common with the settling tank 22 and through which the opening 27 extends. The separated liquor therefore flows through the opening 27 into the tank 28 and is aerated and agitated in the tank 28 by a pair of hollow depending agitators 29 having perforations in the upper sides of their lower cross bars as shown to advantage in Figure 2 at 30 and which are similar to the stirrers or agitators 17, and each of which is supported upon a hollow cross shaft 31 mounted in suitable bearings 32 across the upper edge of the activated sludge tank 28.

From the sludge tank 28 the aerated liquor passes through a conduit 33 in the opposite end wall of the tank 28 into a second delivery bell 34 which opens downwardly into a second settling tank 35 constructed similarly to the tank 22 and from the upper portion of which the final liquor is carried off through a conduit 36.

The second settling tank 35 is provided with an air operated injector 37 arranged above the tank 35 and having a pipe 38 which extends down to the bottom of the tank 35, the latter having a downwardly converging bottom for the purpose of lifting the settled activated sludge out of the tank 35 and delivering the same to a return pipe 39 which extends lengthwise of the tanks and has a first delivery spout 40 opening into the upper end of the activated sludge tank 28 for the return of the larger portion of the settled activated sludge from the second settling tank 35. The return pipe 39 continues rearwardly of the tanks and has its second spout 41 opening into the top of the contact aerator tank 16 so as to return the remainder of the settled sludge from the settling tank 35 in the second stage to the aerator tank 16 of the first stage.

The first settling tank 22 is also provided with an air operated injector 42 adapted to lift the settled sludge out of the tank 32 into a return pipe 43 which has a nozzle 44 opening into the conduit 11 for returning such sludge as settles in the tank 32 back into the preliminary tank 10.

The reservoir 45 or other suitable source of air supply is connected by a supply pipe 46 to the hollow shafts 20 and 31 and also to branch pipes 47 which lead to the injectors 37 and 42 for supplying air to these various elements, the connections to the shafts 20 and 31 being rotating or swiveled connections.

The shafts 20 and 31 are each provided with a crank 48 and the cranks are connected to a rod 49 which in turn is connected to a motor 50 or the like for the purpose of reciprocating the rod 49 and the shafts 20 and 31 connected thereto. The return pipe 43 may be connected by a branch pipe 51 to the return pipe 39 so that the activated settled sludge raised by the injector 42 may in part be delivered into the forward end of the return pipe 39 and thus into the aerator tank 16 for passage a second time therethrough.

Activated sludge tanks have no structures inside. The carrier of the purifying agent is the "activated sludge" which forms itself out of the sewage in the tank. This sludge is kept in suspension by stirring the tank contents and is also aerated. On account of this purifying work the activated sludge increases steadily and a certain part thereof must therefore be daily removed as excess activated sludge.

The activated sludge process is superior to the submerged contact aerators in so far as the most complete purifying can be obtained. The process is especially economical when it is arranged in two stages whereby the excess activated sludge of the second stage is not discharged but is returned to the tanks of the first stage which receive the sewage directly and attend to the main purifying.

Complete use of the excess activated sludge of the second stage is made in the first stage and the then resulting, completely used excess activated sludge will be discharged.

Submerged contact aerators having the advantage that they are less sensitive to occasionally appearing industrial poisons and to quick changes in the condition of the sewage, than tanks operated with activated sludge. Submerged contact aerators are in the case of a disturbance, active again in a few hours because the interior structure is stationary. The activated sludge once disturbed must be removed most of the time and it requires one week until the sludge is reconditioned.

In order to combine the advantages of both processes it is suggested that submerged contact aerators be used as first stage and activated sludge tanks as second stage. The plant should be so operated that the excess of the activated sludge tank will first be brought into the submerged contact aerator and used for purifying the sewage before it is discharged definitely. In such a manner one combines the advantages of the submerged contact aerators with the ones of the two stage activated sludge tanks, and receives a purifying process that exceeds economically any process heretofore known.

In operation, the sewage is delivered through the conduit 11 into the preliminary settling tank 10 from which it is discharged and spread into the sludge digestion tank 12. The separated liquor from the top of the preliminary settling tank 11 is carried through the conduit 15 and discharged into the contact aerator tank 16. The agitator or stirrer 17 operates to not only stir up the settlings in the chamber 16 but to also distribute air in fine jets through the liquor.

The lighter liquor is then separated from the upper end of the tank 16 and carried into the first settling tank 22. The sludge accumulating in the bottom of the tank 22 is raised through the pipe 38 by the injector 42 and returned in part to the pipe 39 and in part to the pipe 43 so that the accumulating sludge is in part returned to the conduit 11 for repassage as an activated material through the preliminary settling and the digestion tanks 10 and 12. The other part of the raised sludge goes back directly into the aerator tank 16 and assists at this point in the apparatus in the destruction of the less activated material in the sewage.

The liquor which settles off in the top of the tank 22 is carried through the opening 27 into the activated sludge tank 28, is aerated through the jets 30 and is agitated by the stirrers 29.

The separated liquor then passes from the top of the tank 28 into a second settling tank 35 where it is divided by settling and the lighter liquor passes off through the conduit 36 while the activated sludge in the bottom of the tank 35 is carried back through the pipe 39 as above brought out.

The structure is such that it occupies but small space, carries out the process with rapidity, and combines two separate features in the two different stages of the operation and of the plant so as to more effectively and quickly carry out the desired result.

It is obvious that various changes and modifications may be made in the details of construction and design of the above specifically described embodiment of this invention without departing from the spirit thereof, such changes and modifications being restricted only by the scope of the following claims:

What is claimed is:—

1. A sewage treatment plant comprising two stages, the first stage including a digestion tank, an aerator and a settling tank and the second stage including a sludge tank and a settling tank, agitators mounted in the aerator and sludge tanks, means for operating the agitators, a source of air supply under pressure connected to said agitators for supplying air to the liquor passing through said tanks, return pipes leading from the settling tanks of both stages with the return pipe from the settling tank of the first stage opening into the aerator and digestion tanks and the return pipe from the second stage opening into the sludge and aerator tanks, and air actuated means connected to said source of air supply and to said return pipes for lifting the sludge accumulating in the settling tanks into said return pipes.

2. A sewage treatment plant connected with a digesting sludge tank comprising two stages, the first stage including an aerator, and a settling tank, and the second stage including sludge tanks and a settling tank, agitators mounted in the aerator and sludge tanks, means for operating the agitators, a source of air supply under pressure in connection with the agitators for supplying air to the sewage liquor passing through said aerator and sludge tanks, conduits connecting the tanks of the successive stages for the passage of effluent therethrough, delivery bells in the settling tanks in communication with the connecting conduits leading from the aerator and sludge tanks respetcively, for diffusion of sludge carried over with any effluent, a return pipe leading from the settling tank of the first stage to the aerator, another return pipe from the settling tank of the first stage opening into the digesting sludge tank and in cross communication with the return conduit leading into the aerator tank, and actuated means connected with said source of air supply and to said return pipes for lifting the sludge accumulating in the settling tanks into said return pipes.

In testimony that I claim the foregoing as my invention, I have signed my name hereto.

KARL IMHOFF.